May 8, 1934. C. B. THOMPSON 1,958,217
LUBRICATING DEVICE
Filed Jan. 12, 1933

INVENTOR.
CARL B. THOMPSON
BY
ATTORNEY.

Patented May 8, 1934

1,958,217

UNITED STATES PATENT OFFICE 1,958,217

LUBRICATING DEVICE

Carl B. Thompson, South Bend, Ind., assignor to The Lubrication Corporation, South Bend, Ind., a corporation of Delaware Application January 12, 1933, Serial No. 651,330

4 Claims. (Cl. 184—105)

This invention relates to improvements in lubrication devices and more particularly to lubricant receiving nipples or fittings.

An object of the invention is to provide a lubricant receiving fitting having a fluid and air tight inlet valve therefore permitting the successful use of the fitting in installation where a constant or recurring pressure may be present tending to bleed lubricant back through the valve or in such installations as where a fitting is required to pass lubricant into an air brake cylinder and to preclude the leakage of air therethrough from within the cylinder.

Another object is to provide a lubricant receiving fitting having two inlet valve members arranged in series within the lubricant passageway of the fitting, one of the valve members being of metal and the other of resilient material and both urged upon their respective valve seats by a single valve spring.

A further object is to provide an air tight lubricant receiving fitting.

Figures 1, 2:
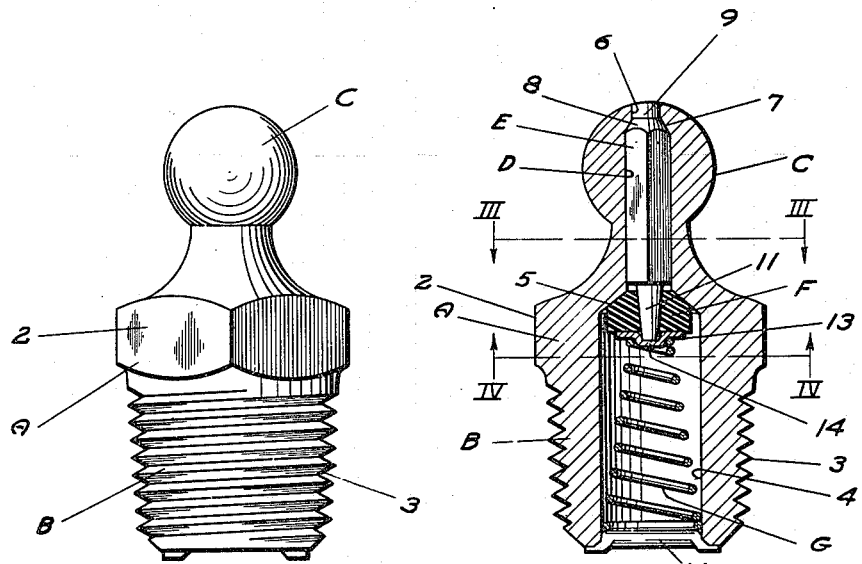
Figures 3, 4:
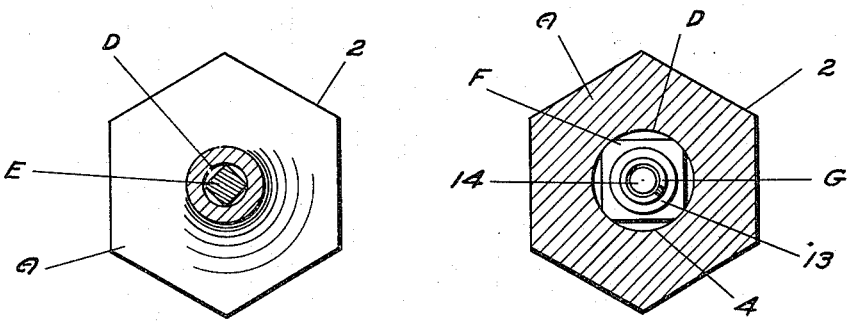

Other objects, the advantages and uses of the invention, will be, or should become apparent after reading the following description and claims and after consideration of the accompanying drawing forming a part of this specification, in which:

Fig. 1 is a side elevation of a lubricant receiving fitting incorporating the features of the invention, Fig. 2 is a sectional elevation of the fitting of Fig. 1, Fig. 3 is a sectional view along the line III—III of Fig. 2, and Fig. 4 is a sectional view along the line IV—IV of Fig. 2.

In general, the lubricant receiving fitting selected for illustration herein comprises a metal body A having a shank B and a head C and provided with a lubricant passageway D extending longitudinally therethrough, a rigid valve member E and a resilient valve member F, in series arrangement urged yieldingly upon their respective valve seats within the passageway D by a common valve spring G and a valve spring retainer H secured to the shank B across the mouth of the passageway D.

The body A of the fitting including the shank B, the head C and passageway D may be formed by screw machine operation of hexagonal steel stock thereby providing at its intermediate portion a hexagonal walled flange 2 by means of which the fitting may be gripped and turned with a mechanic's wrench. The external wall of the shank may be formed with screw threads 3 for securing the fitting within the tapped orifice of a lubricant bearing or lubricant receiving duct.

The passageway D is diametrically enlarged at 4 in that portion extending through the intermediate and shank portion of the fitting to accommodate the valve member F and valve spring G. An annular and conical surfaced valve seat 5 is formed at the inner end of the enlarged portion 4 of the passageway against which the resilient valve member F may seat under the influence of the spring G. The upper end of the passageway D for a relatively short distance inwardly of the surface of the head C is of reduced internal diameter as shown at 6 and an annular and conical walled valve seat 7 is formed at the inner end thereof for receiving the valve member E.

The valve member E may be formed, by screw machine process, of square steel stock to provide a conical seat engaging surface 8 and an outwardly extending portion of reduced diameter 9 arranged to entirely occupy the reduced portion 6 of the passageway D when the valve is closed. The lower end of the valve member E may be formed with a depending, tapered stem 11 upon which the resilient valve member F is mounted. The valve member F is preferably constructed of moulded rubber treated to withstand exposure to lubricating greases and oils, although for obvious reasons other relatively soft moulded material or composition may be substituted if desired. With reference to Fig. 4 it may be seen that the valve member F is square in horizontal cross section, with the corners rounded to ride upon the side walls of the portion 4 of the passageway D, thus leaving ample space at its four sides for the passage of lubricant therethrough when the valves are in open position. The tapered stem 11 is arranged to extend through a central similarly tapered opening through the valve member. Both the stem 11 and the valve member F rest upon a metal stamping 13, against which, the upper end of the spring 6 bears. The center of the stamping 13 is depressed as shown at 14 to receive the end of the stem 11 and to provide on the opposite face of the stamping, a boss about which the upper end of the spring 6 may encompass to locate the spring against lateral movement and to maintain it in axial alignment with the valve assembly thus to promote uniform bearing of the valve members upon their respective seats. The lower end of the spring G bears directly upon the retainer member H which may be constructed of a short length of steel wire extending diametrically across the bottom of the shank B and secured thereto at its opposite ends by electric welding.

A lubricant fitting constructed as described herein may be employed wherever one of conventional structure may be used and in addition may be successfully employed where the conventional fitting with a simple inlet valve for preventing the return flow of lubricant would fail.

An example of such an installation may be found in the ordinary air brake cylinder where lubricant must be fed into the cylinder so that the piston or pistons may operate freely therein and wherein the fitting through which the lubricant is fed to the cylinder must not permit the air in the cylinder to escape therethrough. In order that the air tight characteristics of the fitting described may be attained and maintained throughout the useful life of the fitting the valve members E and F are so related with one another and with the metal stamping 13 as to cause the valve member F to become compressed under the influence of the spring G when the valve E rests upon its seat 7. Any slight irregularities in angular alignment between the valve members E and F are automatically adjusted by the resilient characteristics of the valve member F when urged upon its seat by the spring. If desired, the stem 11 may be formed with a plurality of small burrs on its outer surface for preventing the dislodgment of the valve member F therefrom as when lubricant is urged through the fitting under excessive pressure and the spring highly compressed.

It is to be understood that the described embodiments of the invention herein set forth are presented for the purpose of illustration only, and various changes may be made therein without departing from the spirit and scope of the invention.

I claim:

1. A lubricant receiving fitting comprising, a body having a lubricant passageway therethrough, the walls of said passageway being formed to provide a pair of spaced apart annular valve seats, a rigid valve member adapted to engage one of said valve seats, a non-rigid valve member adapted to engage the other of said valve seats, and a single means for urging said valve members, yieldingly upon their respective seats.

2. A lubricant receiving fitting comprising, a body having a lubricant passageway therethrough, the walls of said passageway being formed to provide a pair of spaced apart annular valve seats, a rigid valve member adapted to engage one of said valve seats, a non-rigid valve member adapted to engage the other of said valve seats, and a single means for urging said valve members yieldingly upon their respective seats, the contacting area of said non-rigid valve member and its cooperating valve seat being greater than that of said rigid valve member and seat.

3. A lubricant receiving fitting comprising a body having a lubricant passageway extending longitudinally therethrough, the walls of said passageway being formed to provide a pair of valve seats, a rigid valve member arranged to bear upon one of said valve seats, said valve member having a portion of reduced diameter at one end thereof, a second and non-rigid valve member substantially annular in shape located on said reduced portion of said first named valve member and having its outer surface arranged to bear upon the remaining valve seat, and means for urging both of said valve members upon their respective seats.

4. A lubricant receiving fitting comprising a body having a lubricant passageway extending longitudinally therethrough, the walls of said passageway being formed to provide a pair of valve seats, a valve member arranged to bear upon one of said valve seats, said valve member having a tapered portion of reduced diameter at one end thereof, a second valve member of pliant material substantially annular in shape located on said reduced portion of said first named valve member and having its outer surface arranged to bear upon the remaining valve seat, the inner walls of said annular valve member being tapered to accord with the taper of said valve portion of reduced diameter, and means for urging both of said valve members upon their respective seats.

CARL B. THOMPSON.